Feb. 12, 1935. E. G. LOOMIS 1,990,555
APPARATUS FOR MIXING AND KNEADING PLASTIC MATERIALS
Filed Oct. 11, 1929 2 Sheets-Sheet 1
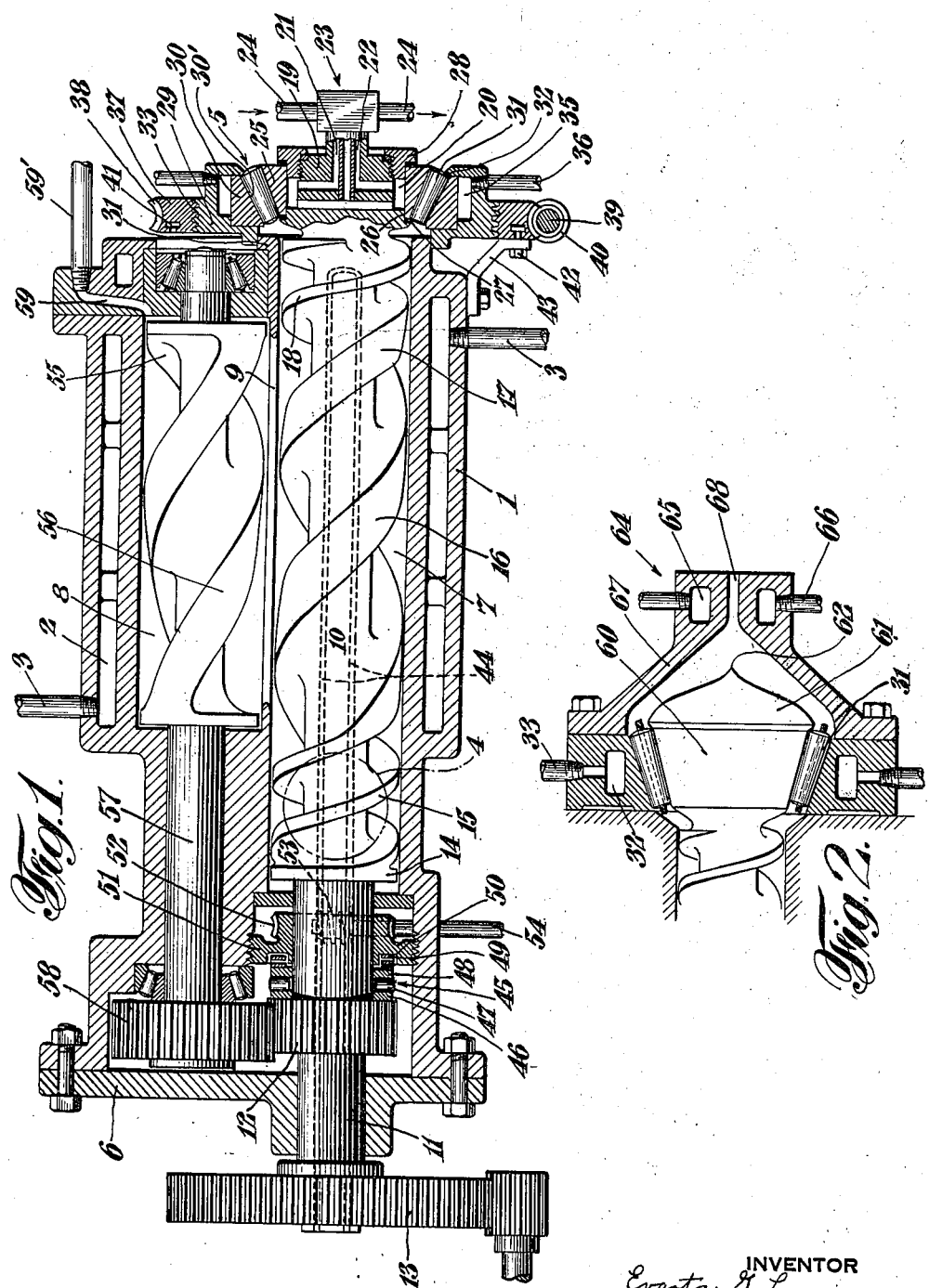
INVENTOR
Everts G. Loomis
BY
Prindle, Bean & Mann
ATTORNEYS

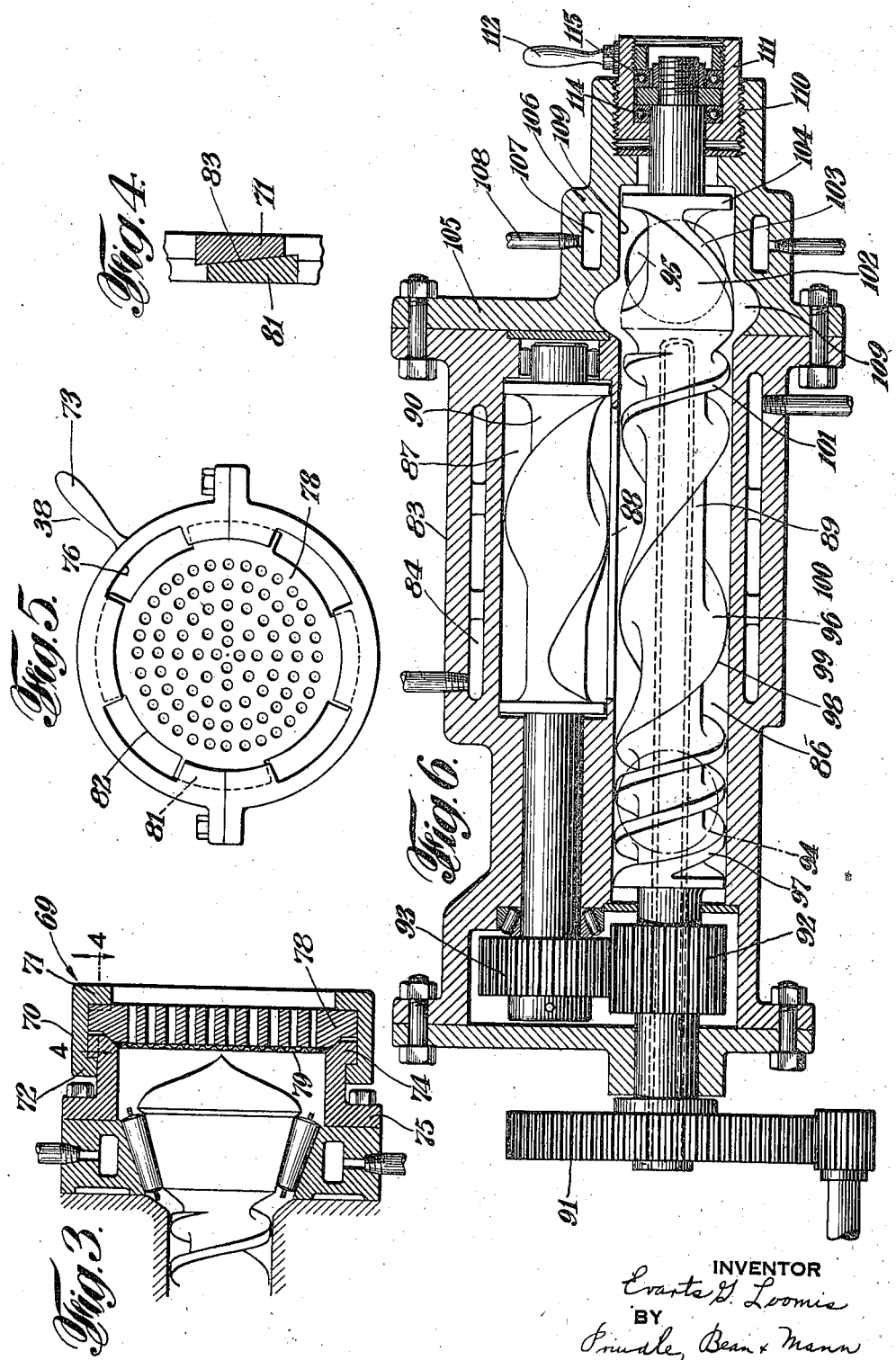

Patented Feb. 12, 1935

1,990,555

UNITED STATES PATENT OFFICE 1,990,555

APPARATUS FOR MIXING AND KNEADING PLASTIC MATERIALS

Evarts G. Loomis, Newark, N. J.

Application October 11, 1929, Serial No. 398,850

13 Claims. (Cl. 18—2)

This invention relates to a method of and an apparatus for continuously mixing and kneading plastic materials such as used, for example, in the rubber, linoleum, celluloid, bakelite and other similar industries. In practice heretofore in certain industries it has been necessary to first mix the material, then remove the mixed batch and transfer it to rolling mills where the grinding and further reduction took place. Then the batch was transferred to hydraulic presses for forming the material into cakes prior to being cut into sheets on sheeting machines or else it was introduced into hydraulic extruding machines, or stuffers for producing rods or tubing.

One object of my invention is the elimination of many of these steps and to provide a machine which will perform all necessary operations on a batch of material, and have a continuous operation where the crude material is put in at one end and the finished material is taken out or discharged at the other end.

Another object of the invention is the provision of such a machine which is efficient in operation and of simple and durable construction.

For one general type of process and machine, I provide a continuous mixing operation, where the various ingredients can be introduced in a hopper of some form for feeding a chamber with rotating spiral or bladed rotating member, or a pair of parallel members operating in opposite directions; the material would be carried away from the hopper through a cylindrical or fluted chamber, or pair of chambers and may be subjected to heat, or any regulated temperature, pressure or vacuum and at the same time be mixed, plasticized and kneaded, then delivered to a rolling or grinding action, which may be operated by one or a series of devices similar in type of construction to a ball bearing or a roller bearing. For simplicity and efficiency, the inner rotating member may be attached to and driven by one of the rotating mixer members and aligned on the same axis.

Further objects and advantages of the invention will be in part obvious and in part specifically pointed out in the description hereinafter contained, which, taken in connection with the accompanying drawings, disclose several embodiments of my invention, it being expressly understood, however, that various changes may be made in practice within the scope of the appended claims without digressing from my inventive idea.

In the drawings:—

Figure 1 shows a horizontal cross sectional view of one form of machine embodying my invention;

Figure 2 is a vertical cross sectional view of a modified form of the rolling portion of said machine provided with an extrusion head.

Figure 3 is a vertical cross sectional view of the rolling portion of the machine showing a filter head which is adapted to replace the extrusion head shown in Figure 2.

Figure 4 is a cross section taken on line 4—4 of Figure 3.

Figure 5 is an end view of the filter head.

Figure 6 is a view similar to Figure 1 showing a modified structure.

Referring now to Figure 1 of the drawings, the numeral 1 designates an elongated hollow casing or frame which has jacket construction 2 and pipes 3 to circulate a heating or cooling fluid. A vertical hopper 4 (shown in dot and dash lines as a circle) is provided at one end of the casing and a discharge member generally designated as at 5 is provided at the other end. An apertured plate 6 is attached to the hopper end of the device for closing one end of the casing 1. The casing is formed with two communicating cylindrical chambers 7 and 8 which are defined by a low saddle member 9. One or both chambers may be fluted or serrated in whole or in part.

An elongated blade or mixing element 10 is located in chamber 7 and is provided at its one end with a shaft 11 which has a spur gear 12 within the casing near its outer end. Shaft 11 extends through plate 6 to receive spur gear 13. At this end the blade or mixing element 10 is provided with an annular integral disc 14 which fits the chamber 7 and prevents material from going beyond the disc in the wrong direction, that is to the left. The blade 10 is of general helical structure, but is provided in several forms to accomplish different functions. At the feeding end it is formed with a helical screw portion 15 which gives the material a preliminary mixing and also feeds the material toward the center of the casing. At its intermediate part the blade 10 has a kneading or working portion which is formed by the relatively wide blade portions 16 and 17, the edges of which form an acute angle with the saddle member 9 and also with the inside surface of chamber 7. At its farther end the blade has the helical screw portion 18 for conveying the material to the discharge end.

At the discharge end of the machine, the elongated blade or mixing element 10 is formed or provided with a flared or enlarged beveled or conical head 19. It is to be expressly understood that head 19 may be cylindrical or any other suitable shape and also that it may be formed integrally with blade or mixing member 10. This beveled or conical head 19 is provided with annular groove 20 from which bores or passages 21 and 22 lead to a coupling generally designated as 23. This coupling 23 is packed to provide a watertight joint between head 19 which rotates and coupling 23 which is stationary. Pipes 24 are provided for circulating within a cooling or heating fluid within the head 19. Beveled annular ring 25 is fitted into a groove 26 with packing 27 so as to be secured to head 19 adjacent the annular groove 20. Flanged nut 28 screwed on to head 19 forms a means for adjustably and removably holding ring 25 in position.

An annular rotatable member 29 which fits over the flange 31 formed on the casing, is provided with an annular bearing member 30 having a beveled bearing surface 30' disposed opposite the beveled surface of ring 25, whereby a frame and race are provided for roller bearings 31, which are positioned in and guided by groove 32 in member 30. Rotatable member 29 is provided with gear teeth 33 on its periphery. However, instead of roller bearings, ball gearings or other bearings may be used. Rotatable member 29 is provided with a jacket construction 35 and pipes 36 to provide for circulation of a cooling or heating fluid.

A toothed ring 37 which is further provided with a worm gearing 38 on its periphery, meshes with the teeth 33 on member 29. Vertical shaft 39 has a worm 40 engaging gearing 38 to transmit rotary motion to ring 37. In order to prevent movement of ring 37 longitudinally of the machine and in order to provide means for adjusting the member 29, a T-shaped slot 41 is provided in the face or side of the ring 37. Fitting into this slot is a bolt 42 which connects ring 37 to the casing by means of bracket 43. This arrangement allows ring 37 to be rotated but prevents it from having longitudinal movement and also provides means for adjusting the blade relative to the casing. By varying the position of the blades the rate of progress of the material from the hopper to the discharge end is varied. This variation therefore changes the temperature of the mix. The member 29 is directly moved and the blade is also moved due to the pulling of the material being mixed. The structure provides an end thrust bearing.

Blade or mixing element 10 may be provided with passages or bores 44 to permit the circulation of heating or cooling fluid so that the temperature of the blade may be changed to suit any particular condition.

Adjacent the hopper end of the machine a thrust bearing 45 is provided which affords a means for axially moving the blade positively and increasing the pressure between the roller bearings 31 and the contacting surfaces. The thrust bearing is formed of a washer 46 which bears against gear 12, roller bearings 47, washer 48, and heavy spring 49. The spring 49 is seated in a groove 50 provided in an externally threaded member 51 which surrounds shaft 11 and which has screw threaded engagement with a portion of casing 1. This member 51 is also provided with a worm gearing 52 which engages the worm 53 on a rotatable shaft 54. The spring 49 affords a means for allowing the bearing surfaces to separate if any foreign material or a large piece of plastic material lodges between beveled surface 30' and beveled head 19.

A second blade or mixing element 55 is rotatably mounted in chamber 8 by means of suitable bearings as indicated. This element 55 operates in an opposite direction to blade 10 and is shorter in length than said blade 10 cooperating with the kneading of that blade. Blade element 55 is formed with a helical blade 56 of substantial width, the periphery or outer surface of the blade being inclined or sloped so as to form an acute angle with the inside surfaces of the chamber 8 and the saddle member 9. Blade element 55 has the elongated stud shaft 57 journaled in the casing and provided with the spur gear 58 on the end thereof meshing with the spur gear 12 of the element 10. Gear 58 is of slightly larger diameter than gear 12 so that element 55 is rotated at a slower speed than element 10. It is to be expressly understood that each blade may be independently driven at the same or different speeds and that means other than gears may be employed for driving. It is also to be noted that these elements 10 and 55 are preferably in substantially the same horizontal plane and are in communication with each other for a substantial distance, whereby the material being treated is subjected to an extensive and intensive kneading action. In the event the treatment of the material is to be done under pressure or in a vacuum, port or passage 59 is provided communicating with the inside of the casing and having the connection 59' leading to a suitable source of pressure, either negative or positive.

In the modification shown in Figure 2 the beveled end 60 of the blade is shown as being formed integrally therewith. This end is provided with the head formed with the curved conical surface 61 which comes to a point as at 62. A detachable extruding nozzle 64 is mounted upon the end of the casing and provided with the jacketed construction 65 and pipe 66 for the circulation of a cooling or heating medium. This extruding nozzle has an inclined or conical shaped portion 67 corresponding to the shape of and spaced from the head 61—62 of the blade and also has the central extruding opening 68. The conical curved formation of the head assists in the extrusion of the material.

The bearings 31 provide many advantages and perform many functions. In the grinding operations in use now only about 1% to 5% of the surface of the rolls is in useful operation, whereas, in an arrangement such as I have shown, there is a grinding action on every line of contact between the rollers and the adjacent complementary surfaces. In the old roll mills it was necessary to counterbalance the rolls. In my machine the forces tend to balance each other. By my arrangement no lubrication of the roller bearing is necessary since the material worked on functions to keep the surfaces lubricated. In the old roll mills lubrication was necessary and contamination of the product invariably resulted, while in my machine as lubrication of the bearing is eliminated, a purer product is obtained. The bearings 31 also form a bearing for one end of the blade 10.

The roller bearings or other shaped bearings may be used with a blade as shown or other feed screws, mechanical pressure, hydraulic or air pressure, vacuum, gravity or any other means of passing the material through the casing.

It will be apparent from the foregoing description that I have provided an apparatus which in one operation continuously kneads and mixes and extrudes a finished product without transportation from one device to another or without reheating the material.

A filter head 69 is shown in Figures 3, 4, and 5. This is designed to be attached to the discharge end of the apparatus to remove foreign material of various kinds. The filter head itself comprises a ring or annular member 70 having an inwardly turned flange 71 at its front and an inwardly turned flange 72 at its rear and is also provided with an adjusting or operating handle 73. Flange 72 abuts against and engages the flange 74 provided on the ring or annular member 75, which is secured to the discharge end of the casing. The front flange 71 of ring 70 is provided with cutout portions 76. The filter member proper is designated 78 and is illustrated as a perforated plate or disc provided with a screen 9 located on the inside face of the same, and provided with an edge flange 80 and a beveled portion 81, which cooperatively engages similar portions and surfaces of the rings 70 and 75. The filter plate 78 has portions 82 cut away in the flange 80 so that alternate projections and recesses are provided complementary to the alternate projections and recesses provided in the ring 70. In attaching the filter head the projections of the filter plate fit through the cutout portions 76 of the ring 70, which is then rotated. As the contacting surfaces of the flange 71 and the outside face of the filter plate 78 are beveled as at 83 (see Figure 4), the parts are securely locked together by means of the friction joining.

The rear flanges 72 and the flanges 74 of ring 75 may be similarly provided with spaced cutout portions to form alternate recesses and projections so as to permit the removal of the ring 70 by rotation with respect to ring 75, and also to afford a simple locking means for the same.

The modification of the apparatus as a whole is shown in Figure 6. This is designed more particularly for lighter plastic materials. Casing 84 is similar to casing 1 and provided with a similar jacketed construction 85 for cooling and heating purposes. The casing is provided with similar chambers 86 and 87 with the interposed semi-partition or saddle 88 having the blade or mixing elements 89 and 90 rotatably mounted therein with the extended shafts, driving gears 91, 92 and 93, feeding hopper 94 and discharge hopper 95, shown in dotted lines. The discharge end of the blade or mixing elements and means for adjusting and moving the same longitudinally are different in this modification from the structure shown in Figure 1. The middle portion of the mixing element or blade 89 is the kneading portion and is formed as a screw or thread 96 of comparatively slight pitch and wide spacing as distinguished from the steeper pitched and narrower spaced feeding portion 97. The portion 96 terminates in a substantially sharp edge 98 having a comparatively long downwardly sloping surface 99 leading to a fairly abrupt upwardly sloping surface 100 to the next ridge or edge 98. The complementary mixing or kneading element 90 has its blade formed similarly and this provides a very effective and efficient means and method of kneading the material being treated.

Mixing element 89 has a conveying screw-threaded portion 101 immediately adjoining the kneading portion 89 which is adapted to feed the material to the discharge end or head 102, which has a gradually curved blade 103 and is located over the discharge opening 5. This end of the mixing element is also provided with the integral disc 104 to prevent the passage of the material beyond that point.

Head member 105 is secured to the discharge end of the casing and is formed with the outstanding or lateral hollow projection 106 through which the discharge end of the mixing element 89 projects and in which it is rotatably mounted. This head member 105 is provided with suitably jacketed construction 107 in pipes 108 for cooling and heating purposes. The interior of head member 105 is hollowed out so as to provide a discharge chamber 109 from which the material is discharged by gravity.

The projection 106 is provided with internal threads 110 at its end to receive the threaded annular member 111 provided with adjusting handle 112. The protruding shaft 113 of the mixing element is provided with a groove or recess 114 to receive balls or rollers 115, a complementary groove or recess being provided in the annular member 111. Adjustment of handle 112 will result in longitudinal movement of the mixing element 89.

In operation and referring to Figure 1 crude material is placed into the hopper 4 and the screw 15 gives this material a preliminary mixing while feeding it to the kneading portion of the blade or mixing element 10. This kneading operation is extensive and is paralleled by the complementary kneading element 55 rotating in the opposite direction so as to tend to move the material opposite to the feeding movement thereof, and thereby retarding its passage through the operation and giving it a thorough kneading and mixing treatment. This is a very efficient method of treating this material as it includes alternate forward and backward motion, as well as a rotary motion or squeezing against the surfaces of the apparatus. As the material passes through the kneading portion of the apparatus it is fed through the bearings 31 and forced through these bearings by the feeding action of the blades. The material is, therefore, given an additional mixing and kneading by being forced through these bearings under pressure and is discharged from the machine in a completely treated and mixed condition ready for use in various industries.

If it is desired to provide the material in the form of a flat strip, the discharge end of the apparatus is provided with the extruding head shown in Figure 2. The operation of Figure 6 is substantially the same with the exception of the differences resulting in the changes in construction over the apparatus shown in Figure 1.

While this invention has been described as being applicable to plastic materials of certain kinds, it is to be understood that the apparatus and method are applicable to various other arts, such as the production of macaroni, spaghetti, candy or other food products, and also for the purpose of mixing lacquer ingredients, pigments, paints, cements, glues, etc.

What I claim is:—

1. In a continuous mixer, a casing provided with chambers, blades in said chambers adapted to mix and knead plastic material, one of said blades being formed with a flared head in spaced relation with the casing and bearings between the flared head and the casing adapted to roll the material in its passage thereby.

2. A mixing element having a helical blade comprising helical narrow screw portions at each end and broad angular portions at the middle thereof, said portions being continuous.

3. A mixing element having a helical blade comprising helical narrow screw portions near each end, broad angular portions at the middle thereof and a flared portion at one end.

4. In an apparatus of the character described, a casing provided with an inlet and a discharge, a plurality of blades in the casing and means for moving one of said blades axially so as to change the rate of progress and the temperature of the kneaded mass.

5. In an apparatus of the character described, a casing formed with a plurality of chambers, a blade in each chamber cooperating to knead plastic material, and an exposed bearing for one of the blades adapted to roll the material.

6. In an apparatus of the character described, a casing formed with a plurality of chambers, a blade in each chamber cooperating to knead plastic material, and a bearing for one of the blades adapted to roll the plastic material and means for increasing the pressure between the bearing surfaces.

7. In an apparatus of the character described, a casing formed with a plurality of chambers, a blade in each chamber, a bearing for one of the blades adapted to roll the plastic material and resilient means for increasing the pressure between the bearing surfaces.

8. In an apparatus of the character described, a casing formed with a plurality of chambers, a blade in each chamber, a bearing at one end of one of the blades adapted to roll the plastic material and a thrust bearing at the other end of the said blade.

9. A mixing element having a helical blade comprising conveying portion, a kneading portion and a smooth portion, said conveying portion being of low pitch and the kneading portion of the blade having wide surfaces substantially spread apart.

10. A mixing element having a helical blade comprising conveying portion, a kneading portion and a smooth portion, said conveying portion being of low pitch and the kneading portion of the blade having wide surfaces formed on an acute angle with reference to the longitudinal axis of the element.

11. In a continuous mixer, a casing provided with a chamber, a blade in said chamber adapted to mix plastic material, said blade being formed with a flared head in spaced relation with said casing and bearings between said flared head and said casing adapted to roll the material in its passage thereby.

12. In a continuous mixer, a casing provided with a chamber, a mixing element in said chamber, said mixing element being formed with a flared head in spaced relation with said casing and means between said flared head and said casing adapted to roll the material in its passage thereby.

13. In an apparatus of the character described, a casing formed with a mixing chamber, a plurality of mixing blades in said chamber and adapted to mix and knead plastic material, and bearing means for one end of one of said mixing blades for rolling the kneaded material leaving said mixing chamber.

EVARTS G. LOOMIS.